United States Patent [19]

Crooks et al.

[11] 4,456,915

[45] Jun. 26, 1984

[54] PRINT HEAD FOR HIGH RESOLUTION ELECTROTHERMAL PRINTING APPARATUS

[75] Inventors: Walter Crooks, Los Gatos; Cameron H. Hafer, San Jose; William J. Weiche, Los Gatos, all of Calif.

[73] Assignee: International Business Machines Corporation, Armonk, N.Y.

[21] Appl. No.: 466,275

[22] Filed: Feb. 14, 1983

Related U.S. Application Data

[63] Continuation of Ser. No. 276,317, Jun. 22, 1981, abandoned.

[51] Int. Cl.[3] ........................ G01D 15/10; H05B 3/00; B41J 3/20

[52] U.S. Cl. ................................ 346/76 PH; 219/216; 400/120; 427/121

[58] Field of Search ........................ 346/76 R, 76 PH; 219/216; 400/120; 427/121

[56] References Cited

U.S. PATENT DOCUMENTS

| | | | |
|---|---|---|---|
| 3,719,621 | 3/1973 | Heinzer et al. | 400/120 |
| 4,195,937 | 4/1980 | Baran | 346/76 PH X |
| 4,329,071 | 5/1982 | Applegate et al. | 346/76 PH X |

*Primary Examiner*—George H. Miller, Jr.
*Attorney, Agent, or Firm*—Otto Schmid, Jr.

[57] ABSTRACT

A printing apparatus employing a print head comprising a plurality of thin wire print electrodes mounted in a single plane and held in a closely-spaced row by an electrically insulating resilient material so that the wires are individually movable out of the planar alignment to a limited extent with respect to the other wires in the array. A relatively rigid backing member is provided to support the electrode array and the print head is mounted in a relatively fixed position relative to the print ribbon and a predetermined pressure is produced between the print head and the electrothermal print ribbon during printing operations.

7 Claims, 5 Drawing Figures

PRINT HEAD FOR HIGH RESOLUTION ELECTROTHERMAL PRINTING APPARATUS

This is a continuation of application Ser. No. 276,317 filed June 22, 1981, now abandoned.

DESCRIPTION

FIELD OF INVENTION

The invention relates to non-impact printing apparatus and, more particularly, to electrothermal printing apparatus in which printing is effected by momentarily selectively energizing an array of electrodes to cause discrete areas of a transfer medium to be resistance heated and release a thermo-sensitive transfer material to a print medium to print characters and other indicia.

DESCRIPTION OF PRIOR ART

Electrothermal printing apparatus in which one or more elements are momentarily energized to heat selected areas of an adjacent thermo-sensitive transfer material which is transferred to a print medium in response to the heat to effect printing is well known in the art. One arrangement is shown in U.S. Pat. No. 2,713,822 to Newman, PLANOGRAPHIC PRINTING, issued July 26, 1955. The Newman apparatus utilizes a three-layer resistive ribbon in conjunction with a single stylus to print facsimile images. U.S. Pat. No. 3,744,611 to Montanari et al, ELECTRO-THERMAL PRINTING DEVICE, issued July 10, 1973 shows an electrothermal printer which utilizes a three-layer resistive ribbon and a row of side-by-side electrodes to effect printing of characters in dot matrix fashion.

Conventional electrothermal printing apparatus has been found to involve a number of problems in the attempt to meet the growing need for improved resolution and greater print rates. The improved resolution requires smaller print dots which requires a smaller cross-section print electrodes. The increased print rates require that the print head be moved faster relative to the print medium in addition to the continuing requirement that the print head be maintained in physical contact with the resistive ribbon. These actions not only increase the wear on the print head but also make it more difficult to maintain the required degree of physical contact with the resistive ribbon. Prior art attempts to solve these problems have not been entirely successful.

SUMMARY OF THE INVENTION

According to the invention, a resistive ribbon type printing apparatus has a print head that provides high resolution printing by a plurality of spaced-apart thin wire electrodes mounted in a single plane, insulating means for resiliently positioning the array of thin wire electrodes so that the thin wire electrodes are individually movable out of the planar alignment to a limited extent with respect to other wires in the array, relatively rigid mounting means for mounting the print head in a fixed position relative to the resistive ribbon, and means for applying a predetermined overall pressure between the print head and the resistive ribbon.

DESCRIPTION OF THE PREFERRED EMBODIMENT

Figure 1:
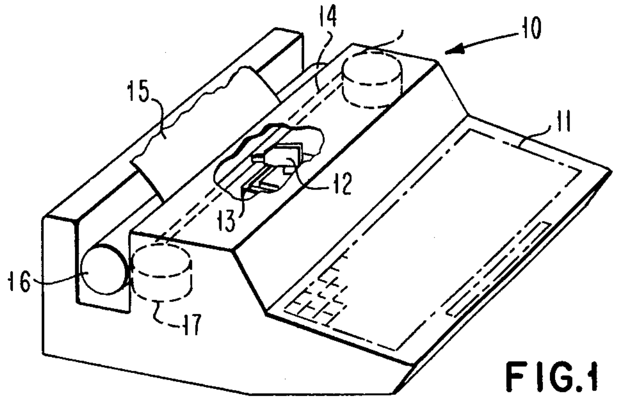
FIG. 1 is a perspective view of a printing apparatus embodying the invention.

The printing apparatus embodying the invention is shown illustratively associated with a typewriter-like printing apparatus 10 comprising a conventional keyboard 11. The keyboard controls a print head 12 by means of a coding device of known type (not shown). Print head 12 is mounted on a carrier 13 that is movable transversely of apparatus 10 but parallel to the feed path of a ribbon 14. Print head 12 presses ribbon 14 against a record medium 15 that is backed up by a platen 16. As in conventional typewriters, ribbon 14 is unwound from a supply reel 17 and wound onto a take-up reel 18, and record medium 15 is fed upwardly in a direction at right angles to the direction of movement of ribbon 14 and print head 12.

Figure 2:
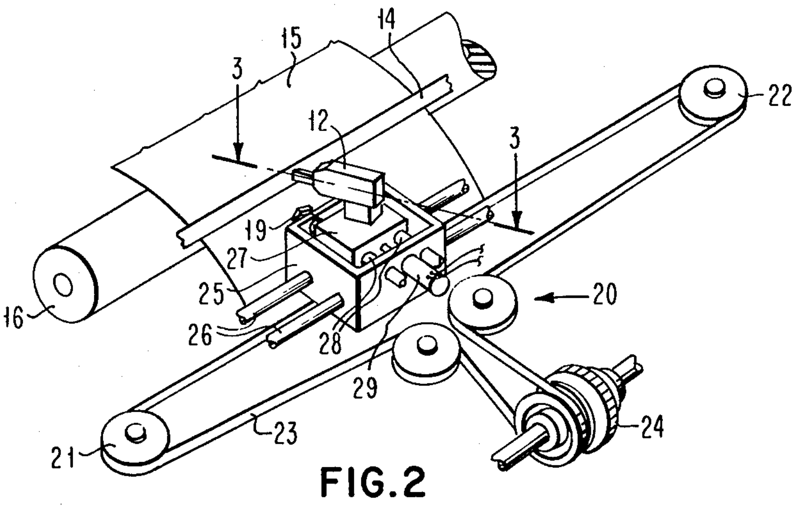
FIG. 2 is a fragmentary schematic perspective view of the print head, the carrier and its drive mechanism.

Print head 12 is mounted on carrier 13 by means to be described later which produces a predetermined overall pressure between the print head 12 and print ribbon 14. Carrier 13 is driven by carrier drive means 20 (FIG. 2) to effect horizontal movement of the print head. Carrier drive means 20 include pulleys 21 and 22 about which is strung a cable 23 which connects to suitable clutch, drive shafts and the like 24.

Carrier 13 comprises a hollow rectangular member 25 which is mounted for movement on horizontal traverse members 26. Print head mounting member 27 is mounted on traverse members 28 for movement toward the print medium for printing operations and away from the print medium for non-printing operations. Traverse members 28 are fixed to hollow rectangular member 25 at a substantially right angle to horizontal traverse members 26. Suitable control means 29 are actuated to move print head mounting member 27 relative to member 25 toward print ribbon 14 and record medium 15 to produce a predetermined pressure between print head 12 and print ribbon 14. An adjustable stop 19 is provided to enable initial setting of the predetermined pressure. In the embodiment shown, control means 29 comprises a solenoid. However, it will be recognized that other suitable electromechanical or mechanical means may be used. Print head 12 is fixed to print head mounting member 27 in a position so that the print electrodes form an angle with respect to platen member 16. This angle is not critical and an angle of about forty-five degrees has been found to be suitable.

Figure 4:
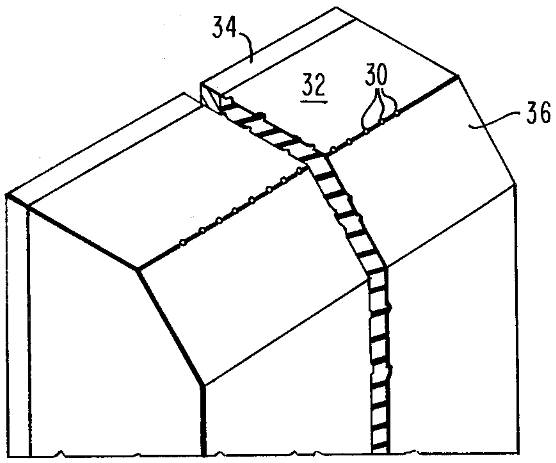
FIG. 4 is a perspective view, also to enlarged scale, of the active printing end of the print head.
Figure 3:
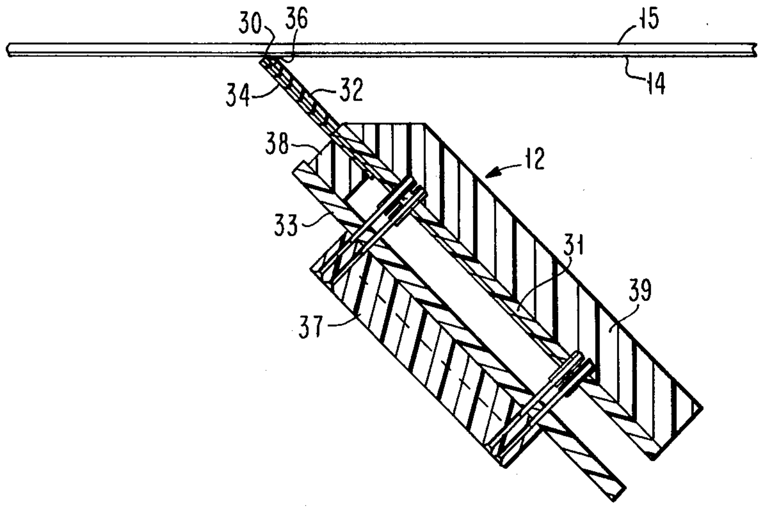
FIG. 3 is a horizontal sectional view, to enlarged scale, taken along line 3—3 in FIG. 2.

As best shown in FIGS. 3 and 4 and according to the invention, print head 12 comprises an array of thin electrodes 30 arranged in a closely spaced row. The electrodes are held in their equally closely spaced position by a suitable electrically insulating resilient material 32. A relatively rigid mounting member 34 is fixed to the electrode structure to permit the print electrode assembly to withstand the required pressure. Print electrodes are electrically connected to a board member 31 which preferably has printed wiring patterns thereon. A support board member 33 is provided through which contact pins 55 are passed between electrical connector 37 and board member 31 to provide an electrical circuit from each print electrode 14 to one of the contacts in connector 37. A mounting block 38 is fixed into position between boards 31 and 33 to hold in a fixed position the end of mounting member 34, which is away from the active ends of the print electrodes. Connector 37 provides the electrical interface between print head 14 and the remainder of the printer, and suitable means such as a flex cable, for example, is provided to conduct signals to the print head. The print head is fixed to a suitable mounting member 39 which provides the mechanical interface to the print head mounting member 27.

The active tip ends of the print electrodes 30 which normally contact the print ribbon 14 are shown in FIG. 4. The electrodes 30 are held in an equally spaced line by electrically insulating resilient material 32 which maintains the electrodes spaced apart from mounting member 34. Silicone rubber is a suitable insulating resilient material due to its ability to withstand the heat generated during operation of the print head. The resilient material is formed with an angled relief portion 36 on the side away from mounting member 34 to enable better electrical contact between the print electrodes 30 and print ribbon 14. This construction also facilitates a limited movement of an individual print electrode out of alignment toward mounting member 34 (FIG. 4) without arcing or other electrical interference. Should debris or a localized ribbon imperfection affect one or more of print electrodes 30, our print head construction permits limited movement of individual electrodes without causing the print head 14 to move out of contact with the ribbon which causes either no printing or poor quality printing to occur.

It is desirable to obtain printing having a resolution or print quality equal to that of engraved type. The minimum resolution that produces printing with resolution approaching that of engraved type is 250 dots per inch resolution. For a printer of the resistive ribbon type, as disclosed here by applicants, to obtain 250 dots per inch resolution, the electrodes are limited to a diameter of 0.001 inch to 0.003 inch. This requirement presents a severe technical problem since electrodes of this size are not self-supporting, and to insure excellent print quality, a pressure of several hundred pounds per square inch is required between the individual electrodes and the resistive substrate.

Electrodes of this size are necessary since 250 dots per inch resolution means dots or lines on 0.004 inch centers, and the thermal spreading characteristics of available resistive ribbons limits the size of the electrodes to 0.001 to 0.003 inch. Electrodes of this dimension are difficult to retain on 0.004 inch centers, particularly since the electrodes are not self-supporting. In a particular embodiment, the print head comprised 40 thin tungsten wire electrodes, each 0.0015 inch in diameter and held accurately equally spaced on 0.004 inch centers by a suitable resilient insulating material which, in that embodiment, comprised silicone rubber. One suitable silicone rubber is a high temperature RTV silicone rubber made by General Electric Company which withstands temperatures up to 500° F. The electrode assembly was fixed to a relatively rigid mounting member which, in that embodiment, comprised spring steel 0.005 inch thick.

Figure 5:
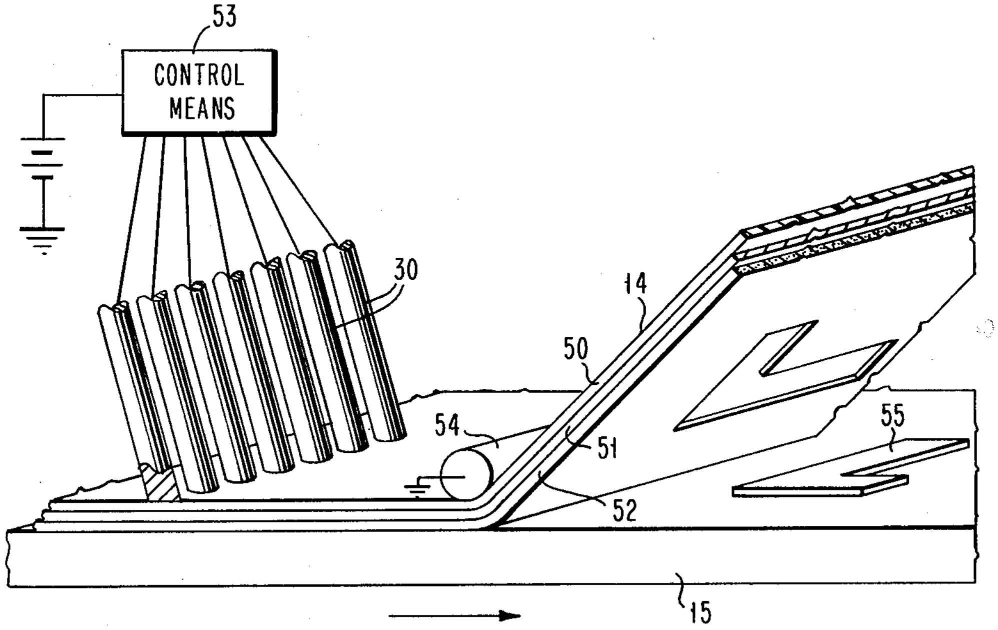
FIG. 5 is a perspective view of the print head in contact with the print ribbon together with illustrative electrical circuitry schematically indicated therein.

The printing electrodes are maintained in a closely-spaced line in pressure contact with ribbon 14, as can be seen in the diagram of FIG. 5. Ribbon 14 comprises a resistive layer 50, a conductive layer 51, and an ink transfer layer 52. The resistive layer 50 is in pressure contact with the print electrodes, and the ink transfer layer 52 is in contact with the record medium 15. Appropriate control means 53 is provided to generate suitable signals to selectively energize print electrodes 30 according to the graphic or character data to be printed. Upon energization of one of the print electrodes 30, current flows from the electrode via the resistive layer 50 and conductive layer 51 to the common return path providing element 54. Element 54 is suitably connected to a reference potential such as ground. As current flows through resistive layer 50, the $I^2R$ effect will cause heating of that portion of the layer 50 that extends from the tip end of the electrode 30 to the conductive layer 51. This localized heating of the resistive layer 50 by the current-resistance effect causes melting of the thermally transferable material in the contiguous portion of the ink transfer layer 52. By concurrent energization of the selected ones of the printing electrodes 30 during movement of print head 12 in the direction of arrow 56 relative to print ribbon 14 and record medium 15, a desired pattern, such as character 55, can be imprinted on the record medium.

The construction of the print head according to our invention permits printing to be accomplished in a reliable manner with excellent print quality even though the print electrodes are not self-supporting, and a pressure of several hundred pounds per square inch must be maintained between the individual print electrodes and the resistive ribbon. In prior art printing apparatus, should debris or a slight imperfection in the surface of the resistive ribbon cause one of the print electrodes to be moved out of position, the entire print head would be moved out of position so that the required pressure could not be maintained between the individual print electrodes and the resistive ribbon. The result is either no printing at all or poor quality printing. In contrast with the prior art operation, the construction of our print head includes the resilient electrically insulating which normally holds the print electrodes in a closely spaced row but has sufficient resiliency so that individual print electrodes can be moved out of position to a limited extent while maintaining the required pressure between the other print electrodes and the resistive ribbon. The mounting member cooperates with the electrode assembly to impart the needed stiffness to withstand the required pressure while maintaining a degree of resilience to the print electrode area due to the spring like nature of the mounting member.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desired to secure by Letters Patent is:

1. A print head for resistive ribbon printing comprising:

an array of thin wire print electrodes mounted in a single plane, each of said spring electrodes having a size which is sufficiently small as to not be self-supporting and having a contact end for electrically contacting the ribbon during printing;

insulating means extending substantially all the way to said contact end of said print electrodes for resiliently positioning the array of print wire electrodes in a closely-spaced line so that the wires are individually movable out of the planar alignment to a limited extent with respect to other wires in the array to maintain all the print electrodes in contact with the ribbon;

relatively rigid backing means fixed to said insulating means for mounting the array in a relatively fixed position relative to said backing means to enable said non self-supporting print electrodes to withstand a predetermined pressure;

means for mounting said print head in a relatively fixed position relative to said print ribbon; and means for selectively applying a predetermined pressure to the print head to produce a predetermined overall pressure between the print head and a print ribbon whereby reliable operation is produced, even though said print electrodes are not self-supporting, due to the support provided by said backing means and the limited movement out of a planar alignment permitted by said insulating means.

2. The print head according to claim 1 in which the print electrodes have a diameter of about 0.0015 inch.

3. The print head according to claim 1 in which said predetermined pressure between said print head and said print ribbon is several hundred pounds per square inch.

4. Apparatus for electrothermal printing using a resistive transfer ribbon comprising:

an array of thin wire print electrodes mounted in a single plane, each of said print electrodes having a size which is sufficiently small as to not be self-supporting and having a contact end for electrically contacting the ribbon during printing;

insulating means extending substantially all the way to said contact end of said print electrodes for resiliently positioning the array of print wire electrodes for a closely-spaced line so that the wires are individually movable out of the planar alignment to a limited extent with respect to other wires in the array to maintain all the electrodes in contact with the ribbon;

relatively rigid backing means fixed to said insulating means for mounting the array in a relatively fixed position relative to said backing means to enable said non self-supporting print electrodes to withstand a predetermined pressure;

means for mounting said print head in a relatively fixed position relative to said print ribbon;

means for interposing an electrothermal printing ribbon between said print head and a record medium;

means for selectively applying a predetermined pressure to the print head to produce a predetermined overall pressure between the print head and a print ribbon; and means for moving the print head relative to the printing ribbon while said pressure is applied whereby reliable high resolution printing is produced even though said print electrodes are not self-supporting due to the support provided by said backing means and the limited movement out of a planar alignment permitted by said insulating means.

5. The apparatus according to claim 4 wherein said plurality of uniformly spaced print electrodes have their contact ends disposed in a line which is generally at a predetermined angle with respect to the direction of movement of the print head.

6. The apparatus according to claim 4 wherein said print electrodes have a dimension of about 0.0015 inch.

7. The apparatus according to claim 4 wherein said predetermined pressure between said print head and said print ribbon is several hundred pounds per square inch.

* * * * *